US005621759A

United States Patent [19]

King

[11] Patent Number: 5,621,759

[45] Date of Patent: Apr. 15, 1997

[54] METHOD FOR COMPRESSING MESSAGE CHECKSUM AND MESSAGE YEARCODE INFORMATION IN A MESSAGING SYSTEM

[75] Inventor: Gerald R. King, Ft. Lauderdale, Fla.

[73] Assignee: Motorola, Inc., Schaumburg, Ill.

[21] Appl. No.: 431,870

[22] Filed: May 1, 1995

[51] Int. Cl.[6] .......... H04B 7/02

[52] U.S. Cl. .......... 375/240

[58] Field of Search .......... 375/240; 371/35, 371/37.1, 37.7, 53; 341/87; 348/384, 420; 370/109

[56] References Cited

U.S. PATENT DOCUMENTS 4,929,946 5/1990 O'Brien et al. .......... 341/87

*Primary Examiner*—Stephen Chin
*Assistant Examiner*—Kevin Kim
*Attorney, Agent, or Firm*—D. Andrew Floam

[57] ABSTRACT

In each receiver (40) at least one datecode is stored which defines a subscription period during which the receiver is entitled to display received messages. For each message (200) to be transmitted, a datecode which defines a particular subscription date to be associated with the message is generated, the datecode defined by a predetermined number of bits. The datecode is compressed into a compressed datecode (220) based on the datecode, the compressed datecode being less in number of bits than the predetermined number of bits of the corresponding datecode. A modified checksum word (230) for the message is generated based on the plurality of bits which represent the message (200) and the predetermined number of bits which represent the datecode that corresponds to the compressed datecode (220). The modified checksum word (230) is associated with the message and the compressed datecode (220) for transmission.

7 Claims, 6 Drawing Sheets

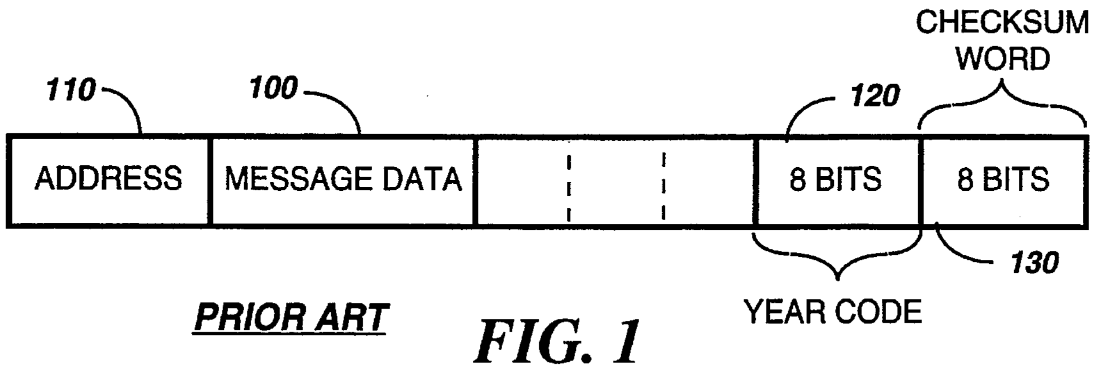
PRIOR ART
FIG. 1
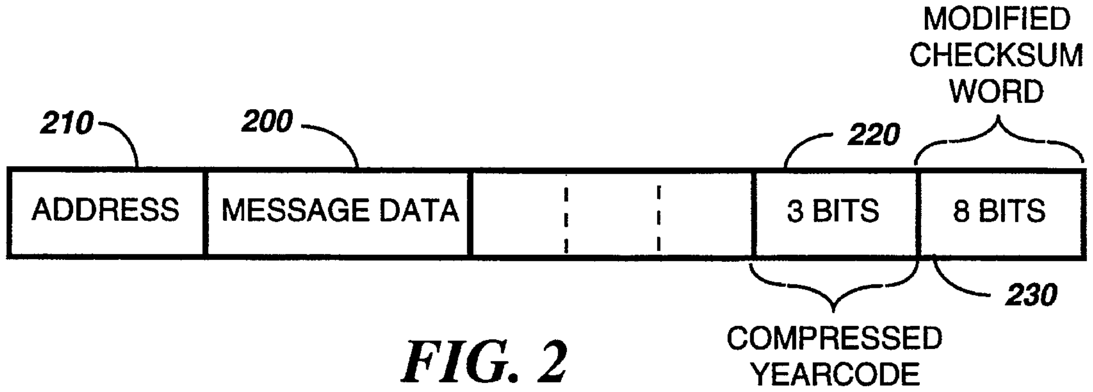
FIG. 2
SUBSCRIPTION TABLE
| YEAR | YEARCODE |
|---|---|
| 1995 | 0000 0000 |
| 1996 | 0000 0001 |
| 1997 | 0000 0010 |
| 1998 | 0000 0011 |
| 1999 | 0000 0100 |
| 2000 | 0000 0101 |
| 2001 | 0000 0110 |
| 2002 | 0000 0111 |
FIG. 3
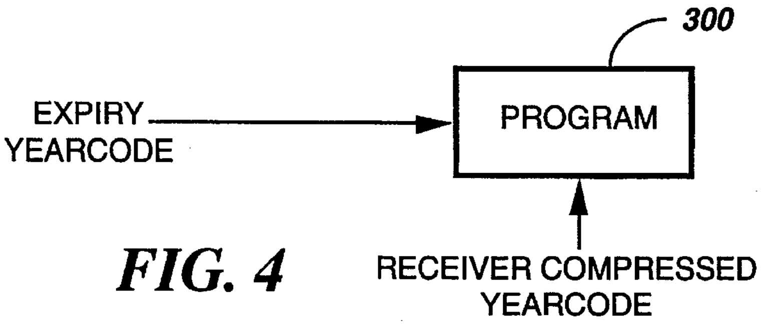
FIG. 4

METHOD FOR COMPRESSING MESSAGE CHECKSUM AND MESSAGE YEARCODE INFORMATION IN A MESSAGING SYSTEM

FIELD OF THE INVENTION

This invention relates in general to the field of messaging systems, such as paging systems, and more particularly to a method for compressing message checksum and message yearcode information that is transmitted in a news information type messaging system.

BACKGROUND OF THE INVENTION

In a transmitter/broadcast controlled subscription messaging system, the transmitted signal includes information which makes the message carried by the signal decodable or not decodable by a receiver, depending on subscription period information stored in the receiver. The subscription period information defines the period of time in months or years, from a particular start date, or until a particular expiry date, that the receiver is entitled to decode certain messages.

It is desirable to reduce the amount of information that needs to be transmitted in a subscription messaging system, and thus reduce the "air-time" for transmitting the information.

BRIEF DESCRIPTION OF THE DRAWINGS

FIG. 1 is a general timing diagram illustrating a method for transmitting subscription messages according to the prior art.

FIG. 2 is a timing diagram illustrating a method for transmitting subscription messages according to the present invention.

FIG. 3 is a diagram of a subscription table of datecodes stored in a receiver according to the present invention.

FIG. 4 is a block diagram showing an alternative method to datecode storage according to the present invention.

DETAILED DESCRIPTION OF THE DRAWINGS

Figure 5:
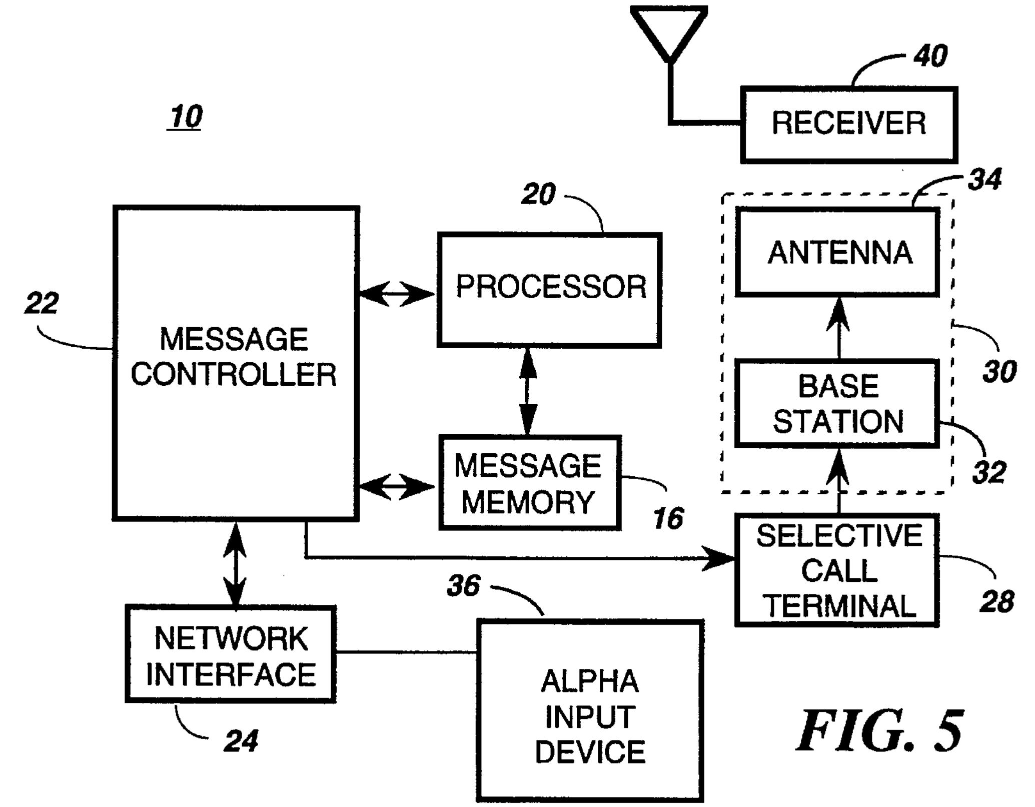
FIG. 5 is an electrical block diagram of a messaging system.

The present invention is directed to a system and method for transmitting subscription messages in a transmitter/broadcast controlled subscription messaging system. In a transmitter/broadcast controlled subscription messaging system, the transmitted signal includes information which causes the message carried by the signal to be displayed or not displayed by a receiver, depending on subscription period information stored in the receiver. The subscription period information defines the period of time in months or years, from a particular start date, or until a particular expiry date, that the receiver is entitled to display certain messages. Messages which are tied to a subscription service are transmitted with subscription date information, hereinafter called a datecode, and the datecode information stored in the receiver must coincide with the datecode information associated with the transmitted message. Other messages, such as system advisement or advertisement messages, are not necessarily tied to a subscription and are intended to be decoded by all receivers in the system, regardless of subscription status.

For example, a message is generated and a datecode corresponding to 1996 is associated with that message. When received by receivers, only those receives which have stored therein a datecode range that includes 1996 would be able to decode the message.

Briefly, the present invention is directed to a method for coordinating the transmission and processing of received messages, involving steps of:

- generating a message represented by a plurality of message data bits;
- generating a datecode for the message which defines a subscription date to be associated with the message, the datecode comprising a predetermined number of bits;
- generating a compressed datecode based on the datecode generated for the message, the compressed datecode comprising less number of bits than the predetermined number of bits of the datecode generated for the message;
- generating a modified checksum word for the message based on the message data bits and the predetermined number of bits which represent the datecode for the message;
- transmitting a signal over-the-air which includes the message, compressed datecode and modified checksum word;
- storing in a receiver at least one datecode defines a subscription period during which the receiver is entitled to display received messages;
- receiving the signal in the receiver and recovering the message data bits, the compressed datecode and the modified checksum word;
- determining from the at least one datecode stored in the receiver an uncompressed datecode which is a stored datecode that best matches the compressed datecode recovered from the signal received by the receiver;
- computing a modified checksum in the receiver based on the uncompressed datecode and the message data bits recovered from the signal received by the receiver;
- comparing the modified checksum word in the signal received by the receiver with the modified checksum computed in the receiver; and
- displaying the message represented by the message data bits recovered from the signal received by the receiver if the modified checksum computed in the receiver matches the modified checksum word recovered from the signal received by the receiver.

In the preferred embodiment, the compressed datecode comprises a plurality of bits equal to a predetermined number of least significant bits of the predetermined number of bits of the datecode.

In one embodiment, a subscription table is stored in the receiver which comprises a plurality of datecodes, and wherein the step of determining the matching datecode comprises determining a datecode in the subscription table whose predetermined number of least significant bits matches the plurality of bits of the compressed datecode.

In another embodiment, a single datecode is stored in the receiver, and wherein a program is stored in the receiver which operates on the compressed datecode received in the signal by the receiver and the single datecode stored in the receiver to determine the matching datecode corresponding to the compressed datecode received in the signal by the receiver.

FIG. I illustrates an example of a known structure for transmitting a subscription message. A message is represented by a message data block 100. A yearcode 120 and checksum word 130 are associated with the message data block 100. In some nomenclatures, the "message" corresponds to message field which includes the message data block 100, yearcode 120 and checksum word 130 such that these three pieces of information are associated in a single field or packet, hereinafter also called an information packet.

The message data 100 has an associated address 110, such as a group address common for a plurality of receivers, make up what is referred to Thereinafter as an information packet. The message data 100 can consist of several sub blocks or bytes, for example, of 4 bits per byte. The address 110 is correlated with a stored address in a receiver in order to permit further reception of the message data 100 and other information following the address, which depends on the protocol used. The protocol used for transmitting the subscription message is, for example, POCSAG, FLEX™ developed by Motorola, or other messaging or paging protocols known in the art.

In certain applications, the address 110 may not be necessary because all receivers that subscribe for subscription service from a service provider can be maintained and controlled by using a single transmission frequency. Thus, only those receivers which are tuned to that frequency by the service provider would be able to receive the transmitted message data, etc. In turn, only those receivers are equipped with software which enable decoding of the transmitted message data, etc.

Also associated with the message data 100 is a yearcode 120 and a checksum word 130. The yearcode 120, in the example shown, is eight bits and the checksum word 130 is eight bits. The yearcode is a specific implementation of the datecode, described above, and specifies the year to which the message is associated. The allotment of eight bits for the yearcode allows $2^8$ different years to be represented by the yearcode. The checksum word 130 is a binary word which is generated by adding or summing the bytes of the message data. The checksum word 130 is useful and widely known technique for error checking when transmitting data.

It is desirable to minimize the amount of information transmitted over-the-air, and thus reduce "air-time". According to the present invention, and with reference to FIG. 2, the yearcode is compressed to comprise the three least significant bits of the full yearcode. In so doing, the compressed yearcode 220 comprises 3 bits, which defines a range of 8 years. As a result, the maximum length of a subscription period is 8 define to be 8 years, which under most circumstances and applications is more than adequate. The address 210 and message data 200 are unchanged from their counterparts shown in FIG. 1. The message data 200 is comprised of a plurality of message data bits, and as well known in the art, the message data bits are organized into bytes, wherein each byte comprises, for example 4 message data bits.

Furthermore, in order to prevent a receiver from decoding messages which are yearcoded with the same three least significant bits, but outside of the actual subscription period, a modified checksum word 230 is also transmitted with the message data 200 and compressed yearcode 220. The modified checksum word 230 is also eight bits but is generated by computing the checksum of the message data 200 and then adding to that resultant the binary value of the full or uncompressed yearcode which corresponds to the compressed yearcode 220. Thus, whereas as 16 bits in the exemplary prior art method are needed to transmit the yearcode and checksum word, only 11 bits, as an example, are needed to transmit effectively the same information according to the present invention.

In a receiver, a subscription table is stored which includes a series of yearcodes which correspond to the years for which the receiver has purchased and subscribed to receive messages. FIG. 3 illustrates an example of a subscription table. In the example shown in FIG. 3, up to eight years are stored in the subscription table, beginning with the year 1995 and continuing through the year 2002. An eight bit yearcode is assigned to the first year, 1995, and the yearcode increments for each of the following years. As will be explained in greater detail hereinafter, the receiver that receives a message with an associated compressed yearcode, accessed the subscription table to determine from the 3 bit compressed yearcode, the full yearcode that corresponds to it. A match is searched for in the 3 least significant bits of the 8 bit yearcode stored in the subscription table.

In accordance with an alternative embodiment of the present invention, and with reference to FIG. 4, only a single yearcode is stored in the receiver, that being the expiry yearcode. The expiry yearcode is the yearcode that corresponds to the last subscription year for the receiver to receive subscription messages. A microprocessor program or algorithm 300 is stored in the receiver which operates on the expiry yearcode and the received compressed yearcode to generate the full yearcode corresponding to the received compressed yearcode. The program 300 decrements the expiry yearcode up to 7 times (in the example of an 8 year subscription period) to generate the other subscription yearcodes. Alternatively, the single yearcode could be the initial yearcode of the subscription period, or some other yearcode in the subscription period.

Turning now to FIG. 5, a subscription messaging system 10 according to the present invention comprises a processor 20, a message controller 22, a message memory 16, a network interface 24, such as the public telephone switching network (PTSN), a selective call terminal 28, and a transmitter 30 including a base station 32 and antenna 34. In addition, FIG. 5 shows an alphanumeric input device 36 which is used to generate messages that are transmitted to one or more receivers 40. In a subscription messaging system of the type according to the present invention, the messages consist of news "flashes", sports reports, specialized data suitable for unique displays in a receiver, etc. Thus, these stories are input by the alphanumeric input device 36, which is a keyboard, optical scanner, etc., or through by a software program executing at the processor 20 itself. The alphanumeric input device 36 alternatively is directly connected to the selective call terminal 28, in the case of a dedicated subscription messaging system, or access a messaging system via the network interface 24.

In either case, the yearcode, compressed yearcode and modified checksum word and associated with the message data by the processor 20 or selective call terminal 28. The transmitter 30 then modulates this information onto a radio frequency signal which is transmitted by antenna 34.

Figure 6:
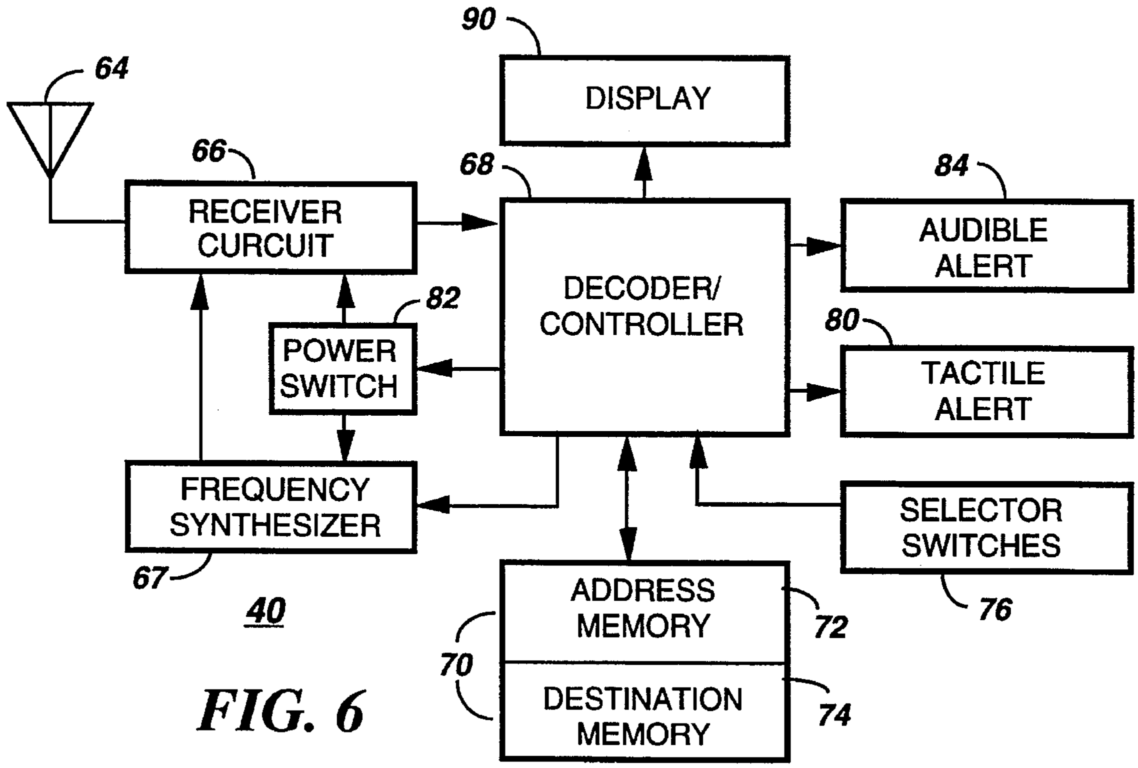
FIG. 6 is an electrical block diagram of a selective call receiver according to the present invention.

FIG. 6 illustrates the components of the selective call receiver (pager) 40 according to the present invention. It should be appreciated with those with ordinary skill in the art that the selective call receiver 40 is optionally incorporated into a personal data assistant, personal computer, computer memory card device, etc. The selective call receiver 40 will be referred to hereinafter as the receiver 40, for simplicity.

The receiver 40 comprises an antenna 64, a receiver circuit 66, a frequency synthesizer 67, a decoder/controller 68, a code-plug memory including an address memory 72 and a destination memory 74, selector switches 76, tactile alert 80, power switch 82, audible alert 84 and display 90. The interaction of these components shown in FIG. 6 is well known in the art. The subscription table shown in FIG. 3 or the program 300 shown in FIG. 4 are stored in the decoder/controller 68.

Figure 7:
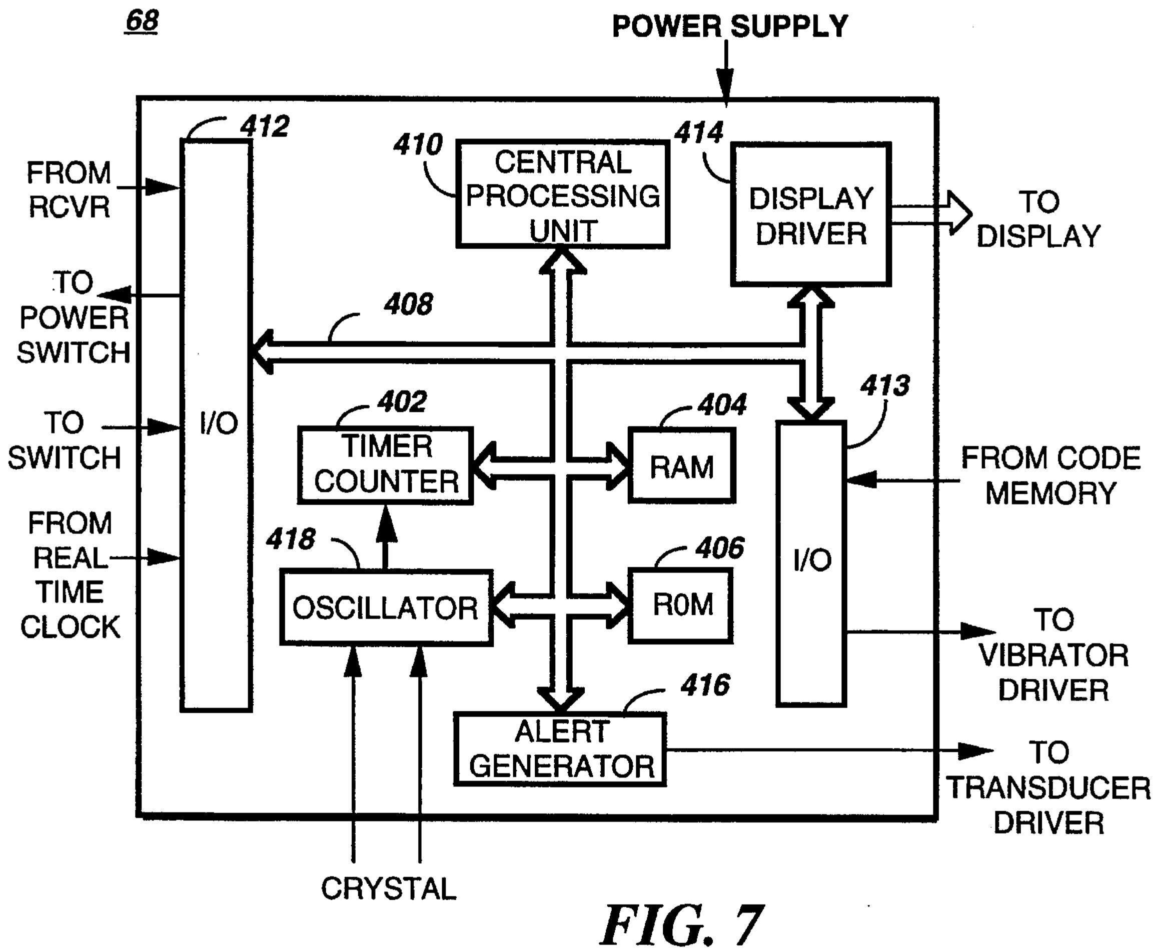
FIG. 7 is an electrical block diagram of a decoder/controller of the selective call receiver shown in FIG. 6.

FIG. 7 illustrates the decoder/controller 68 in greater detail. A detailed explanation of these components is not needed for purposes of understanding the present invention. Briefly, at its heart, the decoder/controller 68 comprises a central processing unit 410 which processes software instructions stored in a ROM 406. The subscription table shown in FIG. 3 or the expiry yearcode and program 300 shown in FIG. 4 is stored in ROM 406. Data flow into and out of the decoder/controller 68 is controlled by input/output (I/O) ports 412 and 413. A timing mechanism for the receiver 40 is generated by a crystal driven oscillator 418. A timer counter 402 is connected to the oscillator 418 for certain timing functions.

The central processing unit 410 generates display control signals which are used to drive the display 90, and to call for generation of alert signals via an alert generator 416.

Figure 8:
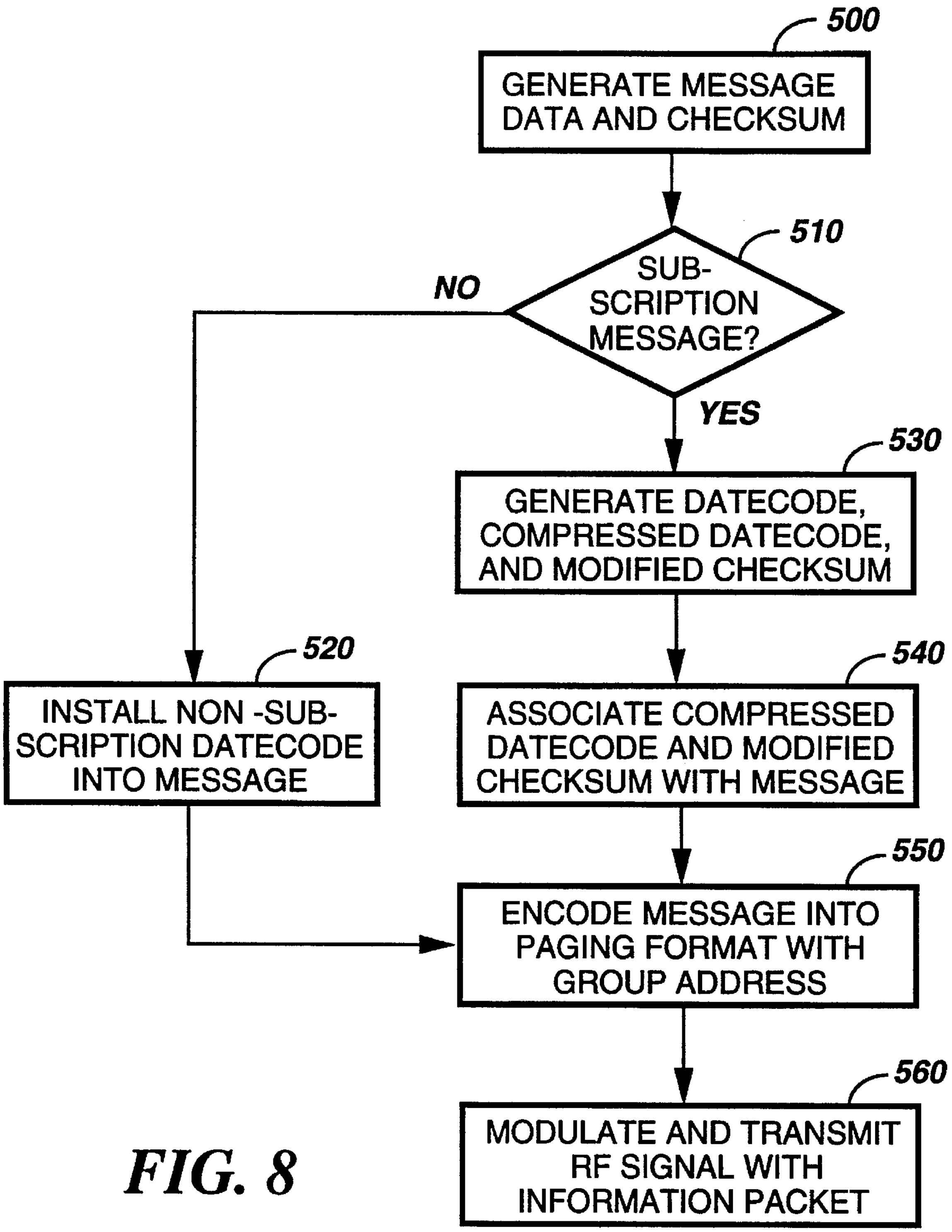
FIG. 8 is a flow chart diagram illustrating steps for transmitting a subscription message according to the present invention.

FIG. 8 illustrates a procedure for generating the message data and associated information for transmission. The term "datecode" in the drawings is used as a more generalized version of the term yearcode. It is envisioned that the datecode is represented by a predetermined number of bits, and that predetermined number of the least significant ones of the datecode bits comprise the compressed datecode. The example wherein the datecode corresponds to a single year has been made above. However, it should be understood that the datecode can represent a month, multiple years etc. In any case, the compressed datecode represented by a reduced number of bits otherwise needed to represent the full datecode, can define a range of a subscription period, such as the eight year period specified above.

Turning now to FIG. 8, in step 500 a message and its checksum word are generated. If this message is a subscription message to which a datecode is to be associated, then in an affirmative response is made in step 510. If the message is not a subscription message, but is a message that should be decoded by all receivers in the system, then in step 520, a non-subscription datecode is associated with the message. Otherwise, the procedure continues from step 530.

In step 530, the datecode, compressed datecode and modified checksum word are generated for the subscription message. For example, if the message is intended for those receivers subscribed in the year 1996, then a datecode corresponding to the year 1996 is generated, together with a compressed datecode for the year 1996. In the example given in FIG. 3, the full datecode is 0000 0001, and the compressed datecode is 001. The modified checksum word is generated by adding the individual bytes of the message data together to generate a transmission checksum, and then adding to the transmission checksum the binary representation of the datecode.

In step 540, the compressed datecode and modified checksum word are associated with the message data. This involves, for example, installing the compressed datecode and modified checksum word into a message field comprising subfields for the bits which represent the message data, compressed datecode and modified checksum word, such as shown in FIG. 2. In step 550, the message is associated with a group address and the resulting information packet is encoded into a paging format. The paging format is POCSAG, FLEX™ of Motorola Inc., or other paging formats. Finally, in step 560, the information packet is modulated onto an RF signal which is transmitted over-the-air.

Figure 9:
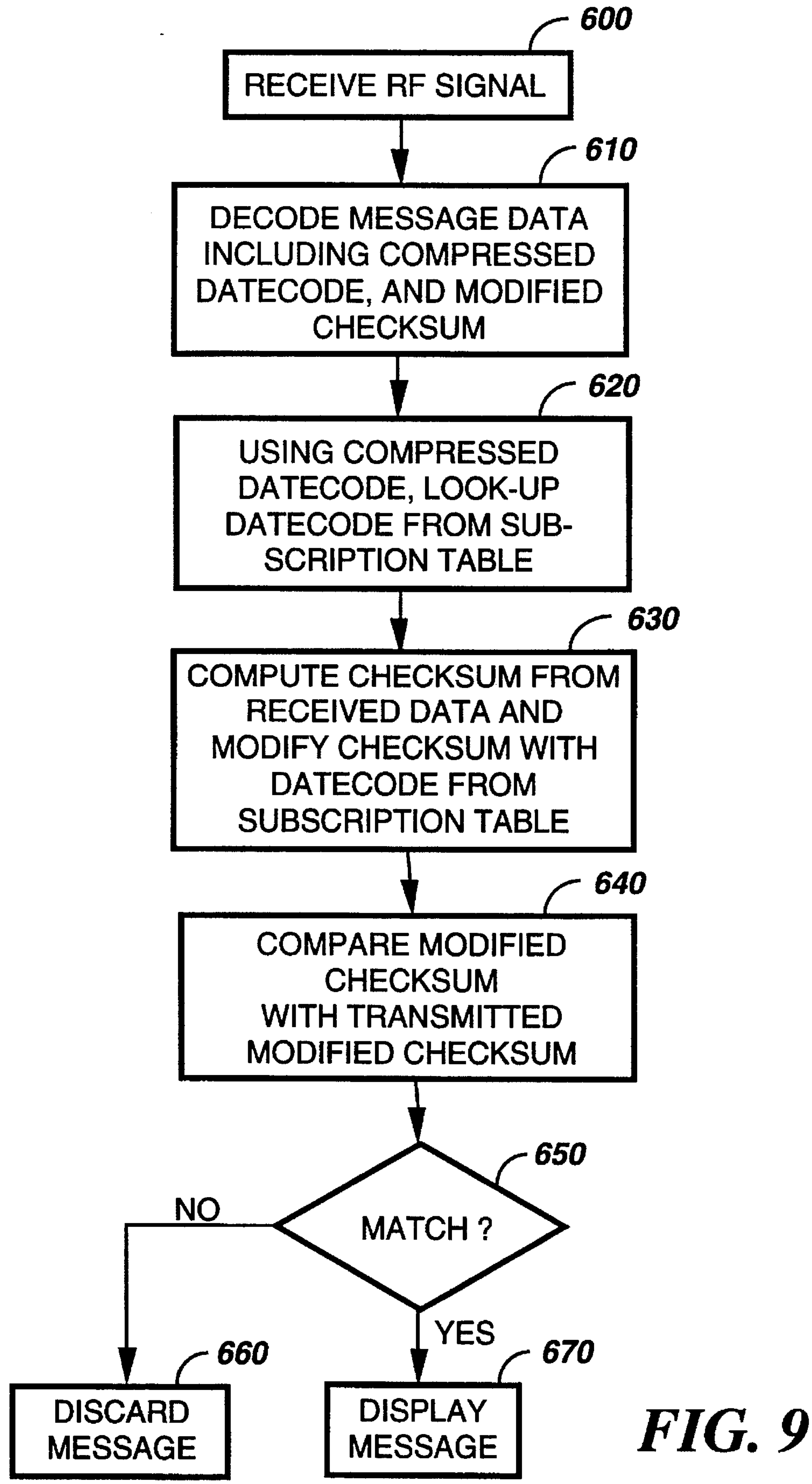
FIG. 9 is a flow chart diagram illustrating steps for receiving and processing a subscription message according to the present invention.

Turning now to FIG. 9, the procedure in the receiver for processing the received RF signal is shown. Initially, and at the time of subscription set-up by the service provider, a subscription table is stored in the receiver including at least one datecode based on the subscription purchased by the user of that receiver.

In step 600, the RF signal is received by the receiver. Next, in step 610, the message data, compressed datecode and modified checksum word are decoded (from the encoded POCSAG, FLEX™, etc. format) from the received RF signal. With the compressed datecode, in step 620 a best match uncompressed datecode corresponding to the compressed datecode in the received signal is determined from the subscription table (FIG. 3).

In step 630, the receiver computes a modified checksum on the basis of the message data from the received signal and the full datecode determined from the subscription table. The modified checksum is computed similar to the modified checksum word, by adding the bytes of the message data together to generate a reception checksum and adding to the reception checksum the binary representation of the uncompressed datecode as determined on the basis of the received compressed datecode.

Next, in step 640, the modified checksum computed by the receiver is compared with the transmitted modified checksum word. If these two quantities match. A test for a match between the modified checksum computed by the receiver and the modified checksum word in the received signal is performed in step 650. If there is a match, then in step 660, the message data is converted to a displayable format and displayed on the display of the receiver. If there is not a match in step 660, then in step 670, the message data is discarded.

Figure 10:
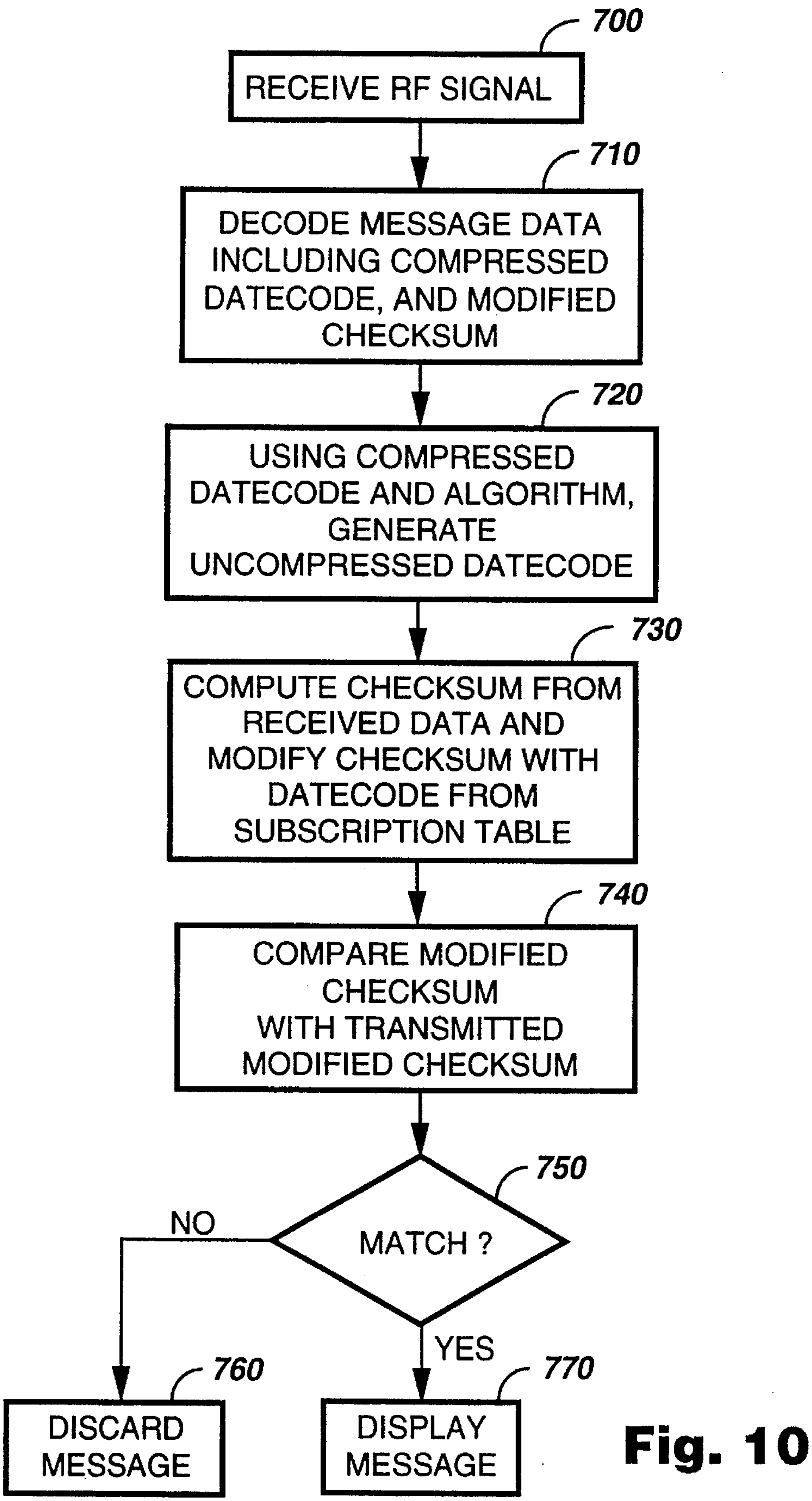
FIG. 10 is a flow chart diagram illustrating steps for receiving and processing a subscription message according to the alternative embodiment of the present invention.

FIG. 10 illustrates a procedure for processing a received signal in accordance with an alternative embodiment of the present invention. Initially, and at the time of subscription set-up by the service provider, a datecode for the expiry date of the subscription is stored in the receiver together with the program 300.

The RF signal is received by the receiver in step 700. In step 710, the information packet including the message data, compressed datecode and modified checksum word is decoded from the received signal.

Next, in step 720, using the compressed datecode and the stored expiry datecode, the program 300 generates an uncompressed datecode which corresponds to the compressed datecode. Then, in step 730, the modified checksum is computed on the basis of the received message data and datecode generated by the program 300.

In step 740, the modified checksum computed in the receiver is compared with the transmitted modified checksum word. In step 750, if the computed modified checksum matches the modified checksum word received by the receiver, then in step 760, the message data is converted to a displayable format and displayed. Otherwise, in step 770, the message data is discarded.

The present invention enables the transmission of subscription messages in a transmitter/broadcast controlled subscription messaging system. By associating with the message data a compressed datecode, it is possible to control the display of messages on receivers which have subscribed to receive messages in a certain subscription period, while minimizing the amount of information needed for transmission to the receiver.

Moreover, the receiver will convert the message data to displayable format and display the message only when the modified checksum computed on the basis of the datecode and received message data matches the modified checksum word transmitted in the information packet.

There are two cases in which the receiver will not decode the message data. The first is when the uncompressed datecode used to generate the modified checksum in the receiver does not match the uncompressed datecode used to generate the modified checksum word in the information packet. This occurs if the uncompressed datecode in the subscription table which is accessed based on the transmitted compressed datecode is not the same as the full datecode used to generate the modified checksum word. Indeed, this is a desired occurrence because this means that the receiver subscription period did not encompass the datecode associated with the message data. In the example shown in FIG. 3, this would occur, for example, when the :full datecode for the message used to generate the modified checksum word is 0000 1001 and the compressed datecode is 001. In this case, the receiver determines from the subscription table that the uncompressed datecode corresponding to the compressed datecode is 0000 0001, which does not match 0000 1001. Consequently, the modified checksum computed by the receiver will not match the modified checksum word transmitted in the information packet.

The second case is when there is error in the transmitted message data such that the modified checksum computed in the receiver on the basis of the received message data and datecode does not match the modified checksum word in the information packet. This can occur even when the datecode in the subscription table matches the datecode used to generate the modified checksum word, i.e., the message is a valid subscription message. Therefore, as expected and desired, the message should also not be decoded if there is error in the received message data, even if the message is within the subscription period of the receiver as defined by the subscription table.

According to the present invention, an unexpired or non-subscription message is transmitted by reserving one of the compressed datecodes, for example, binary 111, to identify the message as non-subscription. That particular compressed datecode and all the corresponding uncompressed datecodes are excluded for use as subscription datecodes. Message data transmitted using the non-subscription compressed datecodes use an unmodified checksum rather than the modified checksum described in the foregoing. Thus, so long as the checksum of the transmitted information and received information match, which would not occur only when transmission errors occur, then the message is displayed.

The above description is intended by way of example only and is not intended to limit the present invention in any way except as set forth in the following claims.

What is claimed is:

1. In a subscription messaging system in which a plurality of receivers subscribe to receive messages for a predetermined subscription period, a method comprising steps of:

generating a message represented by a plurality of message data bits, wherein the message data bits are grouped into bytes;

generating a datecode for the message which defines a subscription date to be associated with the message, the datecode comprising a predetermined number of bits;

generating a compressed datecode based on the datecode generated for the message, the compressed datecode comprising a plurality of bits equal to a predetermined number of least significant bits of the predetermined number of bits of the datecode, which is less than the predetermined number of bits of the datecode generated for the message;

generating a modified checksum word for the message based on the message data bits and the predetermined number of bits which represent the datecode for the message by summing together the bytes of the message to generate a transmission checksum and adding to the transmission checksum the predetermined number of bits which represent the datecode corresponding to the subscription date to be associated with the message;

transmitting a signal over-the-air which includes the message, compressed datecode and modified checksum word;

storing in a receiver at least one datecode which defines a subscription period during which the receiver is entitled to display received messages and a subscription table which comprises a plurality of datecodes;

receiving the signal in the receiver and recovering the message data bits, the compressed datecode and the modified checksum word;

determining from at least one datecode stored in the subscription table of the receiver an uncompressed datecode which is a stored datecode whose predetermined number of least significant bits matches the plurality of bits of the compressed datecode;

computing a modified checksum in the receiver based on the uncompressed datecode and the message data bits recovered from the signal received by the receiver;

comparing the modified checksum word in the signal received by the receiver with the modified checksum computed in the receiver; and displaying the message represented by the message data bits recovered from the signal received by the receiver if the modified checksum computed in the receiver matches the modified checksum word recovered from the signal received by the receiver.

2. The method of claim 1, wherein the step of computing a modified checksum in the receiver comprises summing together bytes of message data bits recovered from the signal received by the receiver to generate a reception checksum and adding to the reception checksum the predetermined number of bits corresponding to the uncompressed datecode.

3. The method of claim 1, wherein the compressed datecode comprises three least significant bits of the datecode.

4. The method of claim 3, wherein datecode defines a single year.

5. In a subscription messaging system in which a plurality of receivers subscribe to receive messages for a predetermined subscription period, a method comprising steps of:

generating a message represented by a plurality of message data bits, wherein the message data bits are grouped into bytes, each byte comprising a plurality of bits;

generating a datecode for the message which defines a subscription date to be associated with the message, the datecode comprising a predetermined number of bits;

generating a compressed datecode based on the datecode generated for the message, the compressed datecode comprising a plurality of bits equal to a predetermined number of least significant bits of the predetermined number of bits of the datecode, which is less than the predetermined number of bits of the datecode generated for the message;

generating a modified checksum word for the message based on the message data bits and the predetermined number of bits which represent the datecode for the message by summing together the bytes of the message to generate a transmission checksum and adding to the transmission checksum the predetermined number of bits which represent the datecode;

transmitting a signal over-the-air which includes the message, compressed datecode and modified checksum word;

storing in a receiver a single datecode which defines a subscription period during which the receiver is entitled to display received messages, and a program which operates on the compressed datecode recovered from the signal received by the receiver and the single datecode stored in the receiver to determine the uncompressed datecode that best matches the compressed datecode received in the signal by the receiver;

receiving the signal in the receiver and recovering the message data bits, the compressed datecode and the modified checksum word;

determining from the at least one datecode stored in the receiver an uncompressed datecode which is a stored datecode that best matches the compressed datecode recovered from the signal received by the receiver;

computing a modified checksum in the receiver based on the uncompressed datecode and the message data bits recovered from the signal received by the receiver by summing together bytes of the message data bits recovered from the signal received by the receiver to generate a reception checksum and adding to the reception checksum the predetermined number of bits corresponding to the uncompressed datecode;

comparing the modified checksum word in the signal received by the receiver with the modified checksum computed in the receiver; and displaying the message represented by the message data bits recovered from the signal received by the receiver if the modified checksum computed in the receiver matches the modified checksum word recovered from the signal received by the receiver.

6. In a subscription messaging system in which a plurality of receivers subscribe to receive messages for a predetermined subscription period, a method for generating and transmitting a message comprising steps of:

generating a message represented by a plurality of message data bits, wherein the message data bits are grouped into bytes, each byte comprising a plurality of bits;

generating a datecode for the message which defines a subscription date to be associated with the message, the datecode comprising a predetermined number of bits;

generating a compressed datecode based on the datecode generated for the message, the compressed datecode comprising a plurality of bits equal to a predetermined number of least significant bits of the predetermined number of bits of the datecode which is less than the predetermined number of bits of the datecode generated for the message;

generating a modified checksum word for the message based on the message data bits and the predetermined number of bits which represent the datecode for the message by summing together the bytes to generate a transmission checksum and adding to the transmission checksum the predetermined number of bits which represent the datecode corresponding to the subscription date; and transmitting a signal over-the-air which includes the message, compressed datecode and modified checksum word.

7. In a subscription messaging system in which a plurality of receivers subscribe to receive messages for a predetermined subscription period, a method for receiving and processing a signal transmitted over-the-air which is received by a receiver, the signal including a message represented by a plurality of message data bits, a compressed datecode which corresponds to a datecode and comprises a predetermined number of bits which is less in number than a plurality of bits otherwise needed to define a datecode, a modified checksum word for the message based on the message data bits and the predetermined number of bits which represent the datecode that corresponds to the compressed datecode, the method comprising steps of:

storing in a receiver at least one datecode which defines a subscription period during which the receiver is entitled to display received messages and a subscription table which comprises a plurality of datecodes;

receiving the signal transmitted over-the-air and recovering the message data bits, the compressed datecode and the modified checksum word;

determining from the at least one datecode stored in the receiver an uncompressed datecode a stored datecode in the subscription table whose predetermined number of least significant bits matches the compressed datecode recovered from the signal received by the receiver;

computing a modified checksum in the receiver based on the uncompressed datecode and the message data bits recovered from the signal received by the receiver summing together bytes of message data bits recovered from the signal received by the receiver to generate a reception checksum and adding to the reception checksum the predetermined number of bits corresponding to the uncompressed datecode;

comparing the modified checksum word in the signal received by the receiver with the modified checksum computed in the receiver; and displaying the message represented by the message data bits recovered from the signal received by the receiver if the modified checksum computed in the receiver matches the modified checksum word recovered from the signal received by the receiver.

* * * * *